United States Patent [19]

Chenoweth

[11] 4,125,463
[45] Nov. 14, 1978

[54] REVERSE OSMOSIS DESALINATION APPARATUS AND METHOD

[76] Inventor: James W. Chenoweth, 4145 San Carlos, Dallas, Tex. 75205

[21] Appl. No.: 845,850

[22] Filed: Oct. 27, 1977

[51] Int. Cl.$^2$ .............................................. B01D 13/00
[52] U.S. Cl. ................. 210/23 H; 210/170; 210/321 R; 210/433 M; 210/460
[58] Field of Search .................. 210/170, 460, 321 R, 210/321 B, 321 A, 433 M

[56] References Cited

U.S. PATENT DOCUMENTS

| | | | |
|---|---|---|---|
| 609,269 | 8/1898 | Etheridge | 10/460 X |
| 3,156,645 | 11/1964 | Chapin et al. | 210/321 R X |
| 3,456,802 | 7/1969 | Cole | 210/321 R X |

OTHER PUBLICATIONS

Grover, et al., "Operating Experience----Pilot Plant", from *The Chemical Engineer*, Jan., 1972, pp. 24–29.

*Primary Examiner*—Frank A. Spear, Jr.
*Attorney, Agent, or Firm*—Bill B. Berryhill

[57] ABSTRACT

Reverse osmosis desalination apparatus may comprise: a casing member placed in a well hole drilled therefor and having near the surface thereof an inlet through which salt water may be introduced from a salt water source; a conductor member centrally disposed within the casing member leaving a first annular space therebetween; a tubular reservoir member centrally disposed within the conductor member leaving a second annular space therebetween; and a permeator assembly attached to the lower end of said conductor member and having osmotic membranes therein responsive to predetermined differential pressures thereacross for separating the salt water into saltfree water and concentrated salt water. The method includes the steps of: pumping salt water from the salt water source through the inlet into the first annular space for flow through the permeator assembly, he hydrostatic head of salt water in the first annular space being sufficient to produce the required predetermined differential pressure across the osmotic membranes; allowing the concentrated salt water, separated by the permeator assembly, to exit the well through the conductor member for disposal thereof; and removing the salt-free water, separated by the permeator assembly, from the well for use thereof.

28 Claims, 3 Drawing Figures

REVERSE OSMOSIS DESALINATION APPARATUS AND METHOD

BACKGROUND OF THE INVENTION

1. Field of the Invention

The present invention pertains to apparatus and methods for desalination of salt water. More specifically, it pertains to apparatus and methods for desalination of salt water by reverse osmosis.

2. Description of the Prior Art

In many areas of the world, there is a shortage of potable water or even water suitable for other uses, such as irrigation, cooling water for chemical processes, etc. In a large number of these areas, however, salt or brackish water is readily available. In fact, 97.2 percent of the surface water of the earth is salt water.

In recent years, apparatus and methods have been devised for desalination of salt water from the sea or some other source. Some of the earlier developed methods require heating or evaporation of the salt water. Such methods have proven to be economically unsuitable for large volume desalination, primarily because of the substantial amounts of energy required therein.

In more recent years, methods involving reverse osmosis have been utilized for desalination of salt water. To understand osmosis, it is best to first consider normal or natural osmosis, the method that living plant and animal cells and organisms use to move body fluids and to supply and clean cell life. In most biological processes, pure fluid moves through cell walls (membranes) toward less pure or more concentrated solutions. In reverse osmosis, a differential pressure is created across a membrane to reverse this natural process, forcing salt-free water through the membrane from less pure fluids, such as sea water. In summary, reverse osmosis provides a semi-permeable membrane which permits water, but not dissolved solids (such as salt) to pass therethrough when the sea water side of the membrane is subjected to high pressure. Although there is no general scientific consensus as to the exact method involved in reverse osmosis, such a description is satisfactory for understanding a desalination system or method which utilizes reverse osmosis.

There are several drawings of reverse osmosis desalination processes. Such systems operate with normal sea water temperatures, greatly reducing scaling and corrosion problems inherent in heat-activated processes. Since the sea water does not have to be heated in reverse osmosis systems, thermal discharge problems, such as disposition of hot water, costly cooling systems, etc. are eliminated. Reverse osmosis systems lend themselves to modular construction allowing relatively easy expansion to increase production.

Since reverse osmosis systems do not require substantial amounts of heat energy, as with other systems such as vapor compression and distillation, its energy consumption is better than many desalination systems of the prior art. However, energy is required to raise the sea water to pressures required for producing the necessary differential pressure across the osmotic membranes for separation of salt-free water from the salt water. These pressures are typically in the neighborhood of 800 to 1000 psi. It can therefore be seen that with large volumes of water, pumping energy is substantial.

Emergency sea water desalination apparatus is shown in U.S. Pat. No. 3,156,645 in which fresh potable water is obtained by reverse osmosis and in which the necessary driving pressure is provided by lowering the apparatus to substantial depths in the sea so that the hydrostatic head of the sea water at that depth provides the necessary differential pressure for reverse osmosis separation. Such apparatus was designed for emergency use and is severely limited in the volume of potable water obtainable thereby and does not lend itself to larger volume, economical operation.

In U.S. Pat. No. 3,456,802, a reverse osmosis desalination system is disclosed which attempts to save pumping energy by submerging osmotic membrane units at "great depths" in the sea, 3,000 feet to 4,000 feet, to utilize the hydrostatic head of the sea water for supplying the necessary differential pressure to the osmotic membranes. However, the amount of energy saved by such a process may very well be offset by installation and maintenance costs since it requires a large cumbersome installation submerged at great depths in the sea. Furthermore, such a system requires a unique location, one which provides extremely deep water immediately adjacent to land. It is not often that 3,000 to 4,000 foot depth sea water is found immediately adjacent to areas where large volumes of desalinized water is needed.

In other reverse osmosis systems, such as the one shown in U.S. Pat. No. 3,637,081, means are provided for recovering some of the energy expanded in pumping the sea water to the pressures required. In such a system, the concentrated salt water left after reverse osmosis separation is passed through positive displacement hydraulic motors which in turn drive generators for recovering some of the initially pumping energy. However, such energy recovery is extremely limited and requires equipment costly to install and operate.

Another temporary disadvantage of reverse osmosis systems is the relative expensive cost of the units, sometimes referred to as permeators, in which the osmotic membranes are provided. However, with increased use of such systems and other improvements therein, it is anticipated that the cost of these permeator units will steadily decline.

Thus, it is seen that reverse osmosis desalination offers many advantages over other types of desalination systems. Increased development and usage of reverse osmosis systems promises other advantages. However, one of the major obstacles to extensive use of reverse osmosis systems seems to be the energy required for raising the sea water to the pressures necessary for osmotic separation. This problem is compounded by the accelerating cost of energy and our ever-decreasing supply of available energy resources.

SUMMARY OF THE INVENTION

In the present invention, a reverse osmosis desalination system and its method of operation is disclosed which will reduce energy requirements to less than half that required by reverse osmosis systems of the prior art. This is made possible by a unique well system which may take advantage of the hydrostatic head of salt water therein for providing the differential pressures necessary for osmotic separation.

The first step in providing such a system is drilling a well to a predetermined depth in a conventional manner such as drilling an oil or gas well. A casing member is installed in the well hole and cemented therein in a conventional manner. A smaller conductor member may then be placed within the casing, leaving an annular space therebetween. Attached to the lower end of the conductor member is a permeator assembly which may include one or more units having osmotic membranes therein responsive to predetermined differential pressures thereacross for separating salt water into salt free water and concentrated salt water. The depth of the well and the depth at which the permeator assembly is placed therein is such that the static head of salt water in the annular space between the casing and conductor members is great enough to create the necessary differential pressure for effecting the necessary osmotic separation. A reservoir of some type is provided within the conductor member near the permeator assembly for receiving salt free water separated therein. A tubular production member may also be disposed within the well with a pump attached to the lower end thereof for disposition in the reservoir for pumping the salt-free water to the surface of the well.

The concentrated salt water left over from the osmotic separation is allowed to exit the well through the conductor member for disposal thereof. The friction head resulting from the salt water moving in the system is the only force to be overcome in the removal of the concentrated salt water. Therefore, the only additional energy that must be supplied from means other than natural hydrostatic heads is the energy required for lifting the separated salt-free water through the production member. Since the volume of salt-free water separated is typically one-third the volume of the initial salt water introduced into the well, the energy required for pumping the salt-free water to the surface of the well is substantially less than the energy required for raising the entire volume of salt water to pressures necessary for reverse osmosis in systems of the prior art. In fact, the energy required is reduced by at least fifty percent.

Although the primary advantage of the system and method of the present invention is its reduced energy requirements, many other objects and advantages of the invention will become apparent from the description which follows in conjunction with the accompanying drawings.

DESCRIPTION OF A PREFERRED EMBODIMENT

Figures 1, 2, 3:
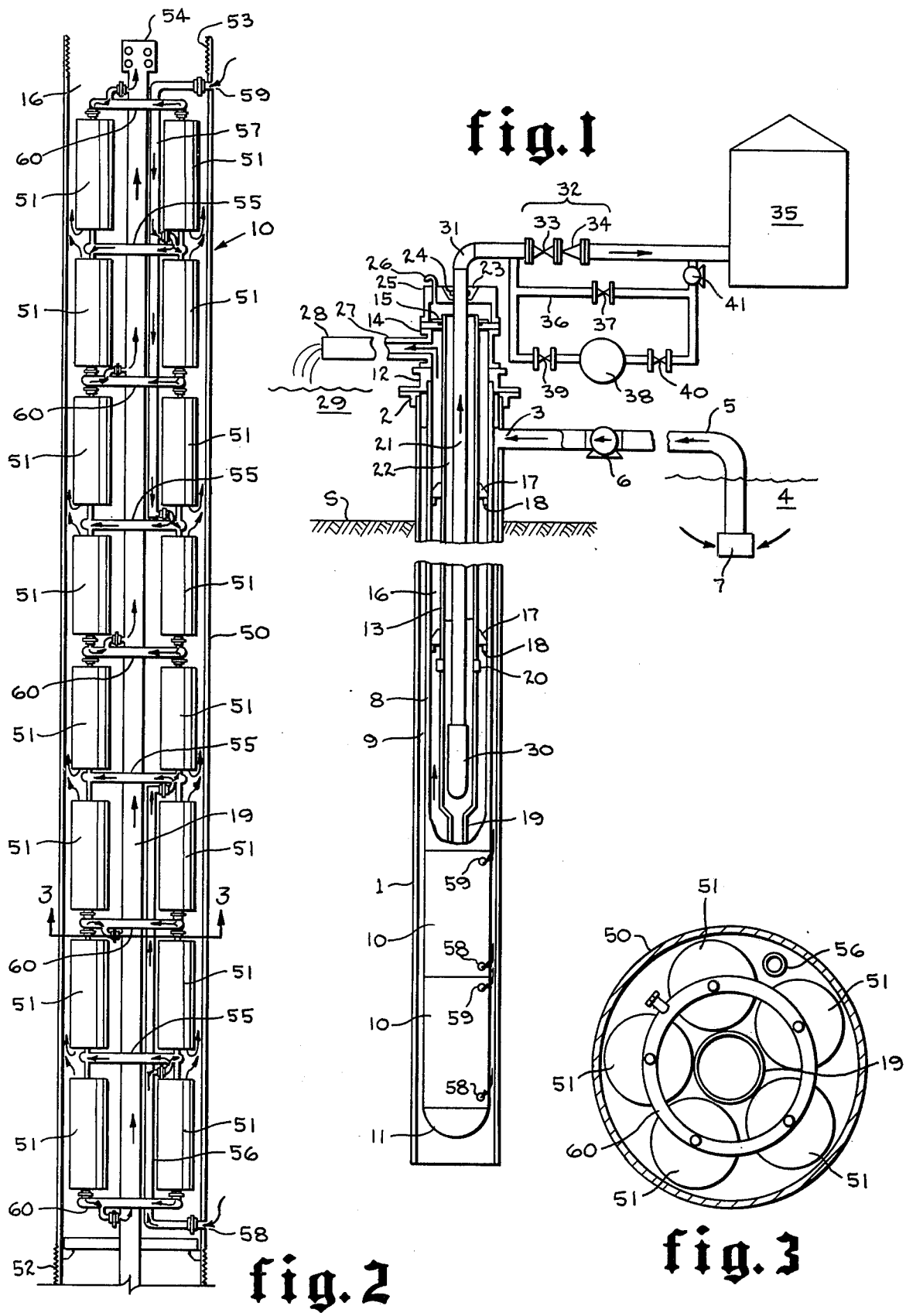
FIG. 1 is a schematic representation of a well system for reverse osmosis desalination of salt water according to a preferred embodiment of the invention.
FIG. 2 is a vertical elevation view of a permeator assembly for use with the reverse osmosis desalination system of the present invention, showing a plurality of permeator units installed in a conductor pipe for connection at the lower end of the conductor string of the well of FIG. 1.
FIG. 3 is a horizontal cross sectional view, taken along line 3—3 of FIG. 2, of the permeator assembly of FIG. 2.

Referring first to FIG. 1, a preferred embodiment of the reverse osmosis desalination system of the present invention will be described. As previously mentioned, the system is installed in a well W which may be drilled from a land surface S, as illustrated, by conventional techniques. It could also be drilled at an offshore location by conventional offshore drilling techniques. In any event, the well is drilled to a predetermined depth, as will be more fully understood hereafter.

After the well is drilled, it is cased by a conventional casing string 1 which is cemented in place in a conventional manner. The casing string 1 projects above the surface S of the well and terminates in a flange member 2 which may be welded or threadably connected thereto. At the surface of the well, the casing string is provided with an inlet 3 for receiving salt water from a salt water source such as the sea, as indicated at 4. Supply line 5 provides fluid communication between the sea water 4 and the inlet 3. A pump 6 is provided for lifting the sea water and pumping it to the inlet 3. It is preferable that the feed salt water for the system be obtained at depths greater than fifty feet where there is less dissolved oxygen and marine life, reducing pretreatment expenses. The feed inlet 7 may also be provided with a screen filter to keep out as many solids as possible. A pretreating station or system (not shown) may be placed between the pump 6 and inlet 3 for removing all suspended particles and marine life and stabilizing the pH of the salt water prior to injection into the well. There are various conventional methods for such pretreating and it will not be further discussed herein.

After the well is cased, a conductor string 8 is run into the well centrally disposed within the casing 1 and leaving an annular space 9 therebetween. Attached to the lower end of the conductor string 8 is a plurality (two in the present case) of permeator assemblies 10, a more detailed description of which will be given hereafter. The conductor string 8 may be suspended by threads, slips or other hanging devices from a conventional hanger head or spool piece 12 which is surmounted on the casing flange 2.

Next, a tubular reservoir string 13 is run into the well and suspended from a spool piece or head 14 by slips or any other suitable means (not shown). A packing gland 15 may be provided for sealing around the tubular reservoir string. The conductor string 8 and reservoir string 13 define an annular space 16. The reservoir string 13 may be provided with support brackets 17 which may engage support rings 18 affixed to the conductor string 8 for at least partial support of the reservoir string 13. The diameter of the reservoir string may be reduced at the lower end 19 thereof for extension into the permeator assemblies 10 as will be more fully understood hereafter. The reservoir string 13 can be connected by slip connections provided with seals such as shown at 20.

Centrally disposed in the reservoir string 13 is a production string 21 leaving an annular space 22 therebetween. The production string 21 is supported by some suspension means such as slips 23 and sealed by a packing gland 24, both of which are carried by a well head 25 surmounted on the spool 14. The well head 25 is vented to the atmosphere by a vent pipe 26, leaving the annular space 22 also vented to the atmosphere.

As already mentioned, a packing gland is provided at 15 sealing the annular space 16 from the well head 25. The pipe spool 14 is provided with an outlet 27 which is connected to a conduit 28 for disposing of concentrated salt water in any suitable disposal reservoir 29. In fact, the reservoir 29 can be the same reservoir from which feed water is provided for the system such as the sea 4. However, it is preferable that the concentrated water disposed through conduit 28 be introduced into the reservoir at a point where it will not materially increase the concentration of salt entering the well.

Attached to the lower end of the production string 21 within the reservoir string 13 and slightly above the reduced diameter portion 19 thereof is a submersible pump 30 for pumping fluids in the reservoir string 13 upwardly through the production string 21.

As shown in FIG. 1, the production string is connected by an ell 31 to a manifold 32 which may include gate valve 33 and check valve 34 through which fluids flowing therethrough pass to a storage tank 34 or the like. A bypass line 36 and valve 37 provide a means of bypassing the gate valve 33 and check valve 34. In parallel with the bypass line 36 is a detergent injector 38 on each side of which is a gate valve 39 and 40. A small pump 41 may be placed in the bypass manifold for backwashing the system as will be more fully described hereafter.

Referring especially now to FIGS. 2 and 3, a typical permeator assembly 10 will be described in detail. Each permeator assembly 10 comprises a tubular housing 50 which actually forms part of the lower end of the conductor string 8. Mounted at several levels, eight in the case shown, are clusters of five reverse osmosis permeators 51. Several companies manufacture permeators and it is contemplated that the permeators 51 would be purchased from one of these manufacturers. One such permeator comprises a shell which surrounds a great many hollow fibers having membranes thereabout. A porous distributor tube is centrally located in the shell and provides an inlet for salt water. The salt water is distributed under the required pressure through the distributor tube through the membrane fibers. Salt-free water passes through the membranes into the hollow fibers. The remaining concentrated salt water passes through a first outlet of the permeator for disposal thereof. The salt-free water in the fibers passes out the end of the fibers into a central gathering point for exit through a second outlet. Since such permeators are commercially available, they will not be further described herein. It is sufficient for the present invention to know that with the proper pressure differential between the incoming salt water and the interior of the membrane fibers, up to one-third of the volume of the salt water can be converted to salt-free water, the remaining two-thirds being simply more concentrated salt water.

The permeators 51 are clustered around the tubular member 19 which, as already described, forms the smaller diameter lower end of the reservoir string 13. Several permeator assemblies 10 could be connected end to end by means such as thread 52 and 53 to increase the capacity of the well. For a typical one million gallons containing forty permeators 51, might be required. A sealing slip connection 54 might be provided at one end of the tubular reservoir member 19 so as to provide a continuous fluidtight reservoir upon connection of a plurality of the permeator assemblies 10. The lower most permeator assembly 10 would be closed by a plug or cap 11 such as shown in FIG. 1.

Circular intake manifolds 55 are provided at alternate levels within the permeator housing 50. The intake manifolds 55 are connected to vertical intake risers 56 and 57 having inlets 58 and 59 in fluid communication with the annular space 9 between the conductor string 8 and the surrounding casing string 1 (see also FIG. 1). The supply manifolds 55 are connected to the inlets of each of the permeators 51 for supplying feed salt water thereto. Circular discharge manifolds 60 are also provided at alternate levels within the permeator assembly 50. The discharge manifolds 60 are connected by suitable piping to the reservoir member 19. The discharge manifolds 60 are also connected to the second outlet of the permeators 51 through which salt free water is discharged for collection within the reservoir member 19 in the above reservoir string 13.

The first outlet of each of the permeators 51, through which passes concentrated salt water remaining after reverse osmosis separation, discharged directly into the annular space between the tubular member 19 and housing 50. This space is in fluid communication and actually forms part of the annular space 16 between reservoir string 13 and the surrounding conductor string 8.

MODE OF OPERATION

Referring now to all of the drawings, the reverse osmosis method for desalination of salt water will be described. Salt water is pumped from the sea 4 through conduit 5 by pump 6. As previously mentioned, it may be pretreated in a conventional manner. The salt water is fed through the inlet 3 into the annular space 9 between casing 1 and the conductor string 8. The discharge pressure of pump 6 need only be high enough to overcome friction losses in the system for the volume required. If, for example, the well is designed for producing one million gallons of free-salt water a day, the pump 6 may have to pump approximately three million gallons of salt water per day.

The salt water in the first annular space 9 enters the permeator assemblies 19 through inlets 58 and 59. From these inlets 58 and 59, the salt water enters the multiple permeators 51 disposed in the permeator assemblies 10 via inlet manifolds 55. The well is drilled to a depth and the permeator assemblies 10 located at depths where the hydrostatic head of the salt water in the annular space 9 will create an inlet pressure into the permeators 51 sufficient for creating the necessary differential pressure across the fibrous membranes within the permeators 51. This pressure is typically in the neighborhood of 800 to 1000 psi. In the permeator 51, the salt water is separated into salt-free water and concentrated water. The concentrated salt water exists through first outlets into the second annular space 16 while the salt free water passes through the membrane fibers and outlet manifold 60 into the reservoir string 19, 13.

The concentrated salt water flows upwardly through the annular space 16 for exit at the outlet 27 for disposal through conduit 28. No additional pumping is required to dispose of this approximately two-thirds of the original volume as the hydrostatic pressures in the well are sufficient therefor.

The salt-free water in the third annular space 22 (approximately one-third of the original volume) may then be pumped upwardly through the production string 21 and the manifold 32 into the storage tank 35 for further use.

If the salt-free water pump 30 fails or is shut off, the water level in the reservoir string 13 will continue to rise until hydrostatic equilibrium is reached across the membranes of the permeators 51. This level will remain static until the pump 30 is started, causing the level to drop. As the level drops, the back pressure is reduced until the required differential pressure across the permeator membranes is reached for resumption of reverse osmosis separation. This feature protects the membranes against overpressure and conveniently provides a way to flush and clean the membranes, as will be seen hereafter.

If desired, the concentrated salt water exiting through outlet 27 can be closely regulated by placing a control valve (not shown) in conduit 28. The valve could be controlled from a flow meter in the salt-free water manifold 32 so that the volume of concentrated salt water flowing by the membranes of the permeators 51 can be closely regulated. During reduced fresh water demands, this throttling feature would reduce the energy requirements of the feed pump 6, resulting in additional energy savings.

For maximum efficiency and extended life of permeator membranes, periodic backwashing with detergent is advised. With the present invention, this operation is relatively simple. This is done by merely shutting off the pump 30, allowing the hydrostatic pressures to equalize and then pumping salt-free water by pump 41 from the storage tank 35 through bypass 36 downwardly through the production string 21. Some of the salt-free water is pumped through the detergent injector 38 and the detergent water pumped into the reservoir 13 rises to create a head which backwashes the detergent-laden water through the permeator membranes in a reverse direction. The detergent combines with the water being flushed and disposed upwardly through annular space 16 and out the disposal line 28. The back flush operation requires only a few minutes to perform and normal production can be resumed in a short time.

The reverse osmosis desalination system and method of the present invention not only lends itself to single well flexibility with the addition of more permeator assemblies 10, it also lends itself to economical multiple well installations, since many pieces of equipment can be used in common. For example, a large capacity feed pump could supply more than one well and common headers could be used for salt-free water collection. In a multi-well system, salt-free water at the proper pressure for backwashing individual wells could be available from the common salt-free water collection supplied by other wells.

A single pulling unit for servicing downhole equipment could be used to serve all wells in a multi-well system. In remote areas where electrical power must be generated, a single large generating unit could provide economical power for all wells and controls. A large feed water pretreatment plant could more economically serve multiple wells than a single well system.

From the foregoing description, it is seen that the system of the present invention, by uniquely utilizing the hydrostatic head of salt water in the well results in substantially less energy requirements than for reverse osmosis systems of the prior art. With such a system, reverse osmosis systems can be commercially competitive with other large volume water supply systems and will attractively provide potable water to many areas of the world where it is not now readily available.

Although a single embodiment of the invention has been described herein, several variations thereof have been mentioned. Many other variations can be made by those skilled in the art without departing from the spirit of the invention. Therefore, it is intended that the scope of the invention be limited only by the claims which follow.

I claim:
1. A well system for desalination of salt water by reverse osmosis comprising:
first tubular means placed in a well hole drilled therefor and having an inlet near the surface of said well through which salt water may be introduced into said first tubular means from a salt water source;
second tubular means centrally disposed within said first tubular means leaving a first annular space therebetween for holding said salt water;
at least one permeator, disposed within said first tubular means near the lower end of said second tubular means, having osmotic membranes therein which permit, in response to predetermined differential pressure thereacross, passage of salt-free water from said salt water from the high pressure side to the low pressure side thereof, leaving concentrated salt water on said high pressure side, said permeator means having an inlet in fluid communication with said first annular space for receiving said salt water therefrom, a first outlet on the high pressure side of said membranes for allowing exit of said concentrated salt and water and a second outlet on the low pressure side of said membranes for allowing the exit of said salt-free water; said permeator being at a depth within said first tubular means at which the static head of said salt water in said first annular space is sufficient to create the necessary differential pressure across said osmotic membranes of said permeator means for permitting said passage of said salt-free water therethrough.

2. A well system for desalination of salt water as set forth in claim 1 comprising third tubular means centrally disposed within said second tubular means leaving a second annular space therebetween in fluid communication with said first outlet of said permeator means and through which said concentrated salt water may pass to the surface of said well.

3. A well system for desalination of salt water as set forth in claim 2 in which said second outlet of said permeator means is in fluid communication with said third tubular means into which said salt-free water may flow for removal from said well.

4. A well system for desalination of salt water as set forth in claim 3 comprising fourth tubular means centrally disposed in said third tubular means leaving a third annular space therebetween and pump means connected to the bottom of said fourth tubular means for pumping said salt-free water from said third tubular member to the surface of said well.

5. A well system for desalination of salt water as set forth in claim 4 in which said third annular space is vented to the atmosphere.

6. A well system for desalination of water as set forth in claim 4 in which said second tubular member is provided near the surface of said well with an outlet through which said concentrated salt water may exit from said second annular space for disposal thereof.

7. A well system for desalination of salt water as set forth in claim 4 including pump means having an inlet in fluid communication with said salt water source and an outlet in fluid communication with the inlet of said first tubular member which is located near the surface of said well, said pump means being one for producing a relatively low pressure for pumping the required volume of salt water from said salt water source and overcoming the frictional losses necessary to reach said first annular space.

8. A well system for desalination of salt water as set forth in claim 4 in which the diameter of said third tubular member is increased above said permeator means to provide an increased volume reservoir for said salt free water.

9. A well system for desalination of salt water as set forth in claim 4 including pump means at the surface of said well in fluid communication with a salt free water source and connected to said fourth tubular member for backwashing said system by pumping a stream of said salt free water through said fourth tubular member and said third tubular member into said permeator means from said low pressure side of said membranes to said high pressure side thereof.

10. A well system for desalination of salt water as set forth in claim 9 including means for injecting detergent into said stream of salt-free water prior to entry into said fourth tubular member.

11. A well system for desalination of salt water as set forth in claim 1 including a tubular housing attached to the lower end of said second tubular member and in which is disposed a plurality of said permeators, first manifold means providing fluid communication between said first annular space and said inlet of each permeator and second manifold means in fluid communication with said second outlet of each permeator and through which said salt-free water may exit for removal from said well.

12. A well system for desalination as set forth in claim 11 in which said first outlet discharges into said housing surrounding said permeators for removal from said well through said second tubular member.

13. A well system for desalination of salt water by reverse osmosis comprising:
   a casing member placed in a well hole drilled therefor and having near the surface thereof an inlet through which salt water may be introduced from a salt water source;
   a conductor member centrally disposed within said casing member leaving a first annular space therebetween;
   a tubular reservoir member centrally disposed within said conductor member leaving a second annular space therebetween; and
   permeator means disposed within said casing member having osmotic membranes therein responsive to predetermined differential pressures thereacross for separating said salt water into salt-free water and concentrated salt water, said permeator means having inlet means in fluid communication with said first annular space for receiving said salt water, first outlet means in fluid communication with said second annular space through which said concentrated salt water may exit said well and second outlet means in fluid communication with said tubular reservoir member through which said salt-free water may exit said well; said permeator means being disposed at a depth in said casing member at which the static head of salt water introduced into said first annular space through said casing member inlet is sufficient to create said predetermined differential pressure across said osmotic membranes.

14. A well system as set forth in claim 13 including a tubular production line centrally disposed within said tubular reservoir member and having a pump attached to the lower end thereof by which said salt-free water in said tubular reservoir is pumped through said production line to the surface of said well.

15. A well system for desalination of salt water as set forth in claim 14 in which said tubular reservoir is vented to the atmosphere and said pump is designed to keep the level of salt-free water in said tubular reservoir substantially below the surface of said well so as to reduce the disposition depth of said permeator means in said casing member.

16. A well system for desalination of salt water as set forth in claim 14 in which said permeator means comprises a cylindrical housing, the upper end of which is attached to the lower end of said conductor member, a plurality of permeator units being disposed within said housing having inlets commonly connected and in fluid communication with said first annular space for receiving salt water therefrom, first outlets through which said concentrated salt water therefrom, first outlets through which said concentrated salt water may be discharged into said housing for exit through said second annular space and second outlets commonly connected and in fluid communication with said tubular reservoir member into which said salt-free water may be discharged.

17. A well system for desalination of salt water as set forth in claim 16 in which said tubular reservoir member comprises a small diameter portion centrally disposed within said housing and a larger diameter portion above said housing in which said pump is disposed.

18. A well system for desalination as set forth in claim 16 in which said permeator means comprises at least two of said cylindrical housings attached one beneath the other, the uppermost of which is attached to said lower end of said conductor member, the lowermost of which has its lower end closed, each of said housings containing a plurality of said permeator units.

19. A reverse osmosis method for desalination of salt water comprising the steps of:
   drilling a well to a predetermined depth;
   placing a casing member in said well for receiving salt water from a salt water source;
   centrally placing a conductor member within said casing member with permeator means attached to the lower end thereof, said permeator means having osmotic membranes therein responsive to predetermined differential pressures thereacross for separating said salt water into salt-free water and concentrated salt water;
   pumping salt water from said salt water source into said casing member near the surface of said well for flow through said permeator means, the hydrostatic head of said salt water in said casing member being sufficient to produce said predetermined differential pressure across said osmotic membranes;
   allowing said concentrated salt water, separated by said permeator means, to exit said well through said conductor member for disposal thereof; and
   removing said salt-free water, separated by said permeator means, from said well for use thereof.

20. A reverse osmosis method for desalination of salt water as set forth in claim 19 in which a reservoir is provided within said conductor member near said permeator means for receiving said separated salt-free water, a tubular production member being centrally disposed in said well with a pump attached to the lower end thereof for disposition in said reservoir and for pumping said salt-free water to the surface of said well through said tubular production member.

21. A reverse osmosis method for desalination of salt water as set forth in claim 20 in which said reservoir is vented to the atmosphere at the surface of said well.

22. A reverse osmosis method for desalination of salt water as set forth in claim 20 and the further steps of:
   ceasing said pumping of said salt-free water to the surface of said well; and
   pumping salt-free water from the surface of said well into said production member and through said permeator means in a direction opposite normal flow therethrough for backwashing said permeator means.

23. A reverse osmosis method for desalination of salt water as set forth in claim 22 in which detergents are mixed with said salt-free water being backwashed through said permeator means.

24. A reverse osmosis method for desalination of salt water as set forth in claim 20 in which said reservoir comprises a tubular member concentrically disposed in said well between said conductor member and said production member, said concentrated salt water exiting said well through the annular space between said conductor member and said tubular reservoir member.

25. A reverse osmosis method for desalination of salt water as set forth in claim 24 in which said concentrated salt water exits said well without applying pressure thereto other than said hydrostatic head of said salt water in said casing member.

26. A reverse osmosis method for desalination of salt water as set forth in claim 19 in which said concentrated salt water is allowed to exit said well without application of pressure thereto other than said hydrostatic head of said salt water, said separated salt-free water being removed from said well by pumping.

27. A reverse osmosis method for desalination of salt water as set forth in claim 26 in which said separated salt-free water is pumped through a tubular production member in fluid communication with said permeator means.

28. A reverse osmosis method for desalination as set forth in claim 20 and the further steps of:
  terminating pumping of salt water from said salt water source;
  terminating pumping of said salt-free water from said reservoir; and
  allowing the level of said salt-free water in said reservoir to rise until hydrostatic pressure balance is attained across said osmotic membranes.

* * * * *